(12) United States Patent
Suda

(10) Patent No.: US 6,867,675 B2
(45) Date of Patent: Mar. 15, 2005

(54) ELECTROMAGNET ASSEMBLY FOR ELECTROMAGNETIC APPARATUS

(75) Inventor: Yoshiyuki Suda, Isesaki (JP)

(73) Assignee: Sanden Corporation, Gunma (JP)

( * ) Notice: Subject to any disclaimer, the term of this patent is extended or adjusted under 35 U.S.C. 154(b) by 170 days.

(21) Appl. No.: 09/788,443

(22) Filed: Feb. 21, 2001

(65) Prior Publication Data
US 2002/0050901 A1 May 2, 2002

(30) Foreign Application Priority Data

Feb. 29, 2000 (JP) .................................. P2000-057933
Aug. 7, 2000 (JP) .................................. P2000-237954

(51) Int. Cl.⁷ .............................................. H01F 27/29
(52) U.S. Cl. .................... 336/192; 439/810; 439/814
(58) Field of Search ............................... 336/192, 198, 336/208, 107; 439/810–814, 486, 874; 335/202

(56) References Cited

U.S. PATENT DOCUMENTS

| | | | |
|---|---|---|---|
| 4,181,393 A | 1/1980 | Lill | |
| 4,419,536 A | 12/1983 | Doyle et al. | |
| 4,429,358 A | 1/1984 | Miyagi | |
| 4,557,544 A | 12/1985 | Esser | |
| 4,623,754 A | 11/1986 | Kikuchi et al. | |
| 4,935,713 A | 6/1990 | Bekheet | |
| 5,138,293 A | 8/1992 | Ishimaru | |
| 5,225,801 A | 7/1993 | Ida et al. | |
| 5,307,038 A | * 4/1994 | Ishimaru | 335/296 |
| 5,320,206 A | 6/1994 | Maejima | |
| 5,508,671 A | 4/1996 | Takashi | |
| 5,812,044 A | 9/1998 | Sakamoto | |
| 5,889,455 A | 3/1999 | Sakamoto | |
| 6,069,547 A | 5/2000 | Sakamoto | |
| 6,091,590 A | 7/2000 | Sakamoto | |

FOREIGN PATENT DOCUMENTS

| | | |
|---|---|---|
| DE | 3024894 | 1/1982 |
| DE | 19640261 | 4/1998 |
| EP | 0422962 | 4/1991 |
| EP | 0806583 | 11/1997 |
| EP | 0834888 | 4/1998 |
| GB | 2248969 | 4/1992 |
| JP | 6-173815 | * 6/1994 |
| JP | 08247171 | 9/1996 |

OTHER PUBLICATIONS

French Search Report, mailed May 30, 2002.

* cited by examiner

Primary Examiner—Lincoln Donovan
(74) Attorney, Agent, or Firm—Baker Botts L.L.P.

(57) ABSTRACT

An electromagnet assembly for an electromagnetic apparatus has a ring member, a coil bobbin having an electrical wire wound a spool of the ring member, and a ring case. The ring member is disposed in an annular groove of the ring case. An opening is formed through the ring case adjacent to its closed end surface. A connector is disposed on the ring case adjacent to its closed end surface and covers the opening. A first and a second ends of the electrical wire and a first and a second ends of a lead wire are joined in, respectively the connector. A projection portion formed on the connector is inserted into the opening, and is fixed adhesively to an end surface of the ring member of the coil bobbin.

3 Claims, 14 Drawing Sheets

_US 6,867,675 B2_

ELECTROMAGNET ASSEMBLY FOR ELECTROMAGNETIC APPARATUS

BACKGROUND OF THE INVENTION

1. Field of the Invention

The present invention relates to an electromagnet assembly for use in an electromagnetic apparatus, such as an electromagnetic clutch for use in controlling the transmission of power from an automobile engine to a refrigerant compressor in an automobile air conditioning system. More particularly, it relates to a connecting structure between a connector and a ring case in the electromagnet assembly.

2. Description of Related Art

Referring to FIG. 1, an electromagnet assembly 7, which comprises a ring member 1, a coil bobbin 3, and a ring case 4, is known in the art. Ring member 1 has a toroidal shape having a spool portion, which has an exterior open edge. Coil bobbin 3 has ring member 1 and an electrical wire 2, which is wound around the spool portion of ring member 1. Ring case 4 has an annular groove, an open edge of which is in a direction parallel to its axis. Coil bobbin 3 is inserted into the annular groove of ring case 4. An opening 4a is formed through ring case 4 adjacent to its closed end surface. A connector 5 is disposed on ring case 4 adjacent to its closed end surface and covers opening 4a. A first end 2a and a second end 2b of electrical wire 2 and a first lead 6a and a second lead 6b, which extend to the external electric circuit, are joined, respectively in connector 5. Electromagnet assembly 7, for example, is used in an electromagnetic clutch 9 of a compressor 8 in an automobile air conditioning system, as shown in FIG. 2. Electromagnet assembly 7 engages compressor 8 through a ring-shaped plate 10, which is affixed to the closed end surface of ring case 4.

Referring to FIGS. 3–6, the connecting structure between connector 5 and ring case 4 and the wiring connecting structure in connector 5 are shown. As shown in FIGS. 3 and 4, connector 5 has a case 5a having a box shape including a bottom, and cap 5b, which closes an open end of case 5a. Case 5a is fixed to ring case 4 by a pair of first hooks 10a formed on ring shaped plate 10 which engage a pair of first receiving portions $5a_1$ formed on case 5a. In an engaging process, first hooks 10a are formed by bending straight portions to engage first receiving portions $5a_1$. Cap 5b is fixed to case 5a by engaging a plurality of second receiving portions $5a_2$ formed at case 5a with a plurality of hooks $5b_1$ formed at cap 5b. A projection portion $5a_3$, which is formed on case 5a, is inserted into opening 4a. An O-ring 11, which is disposed in an annular groove formed on case 5a, surrounds opening 4a and abuts the closed end surface of ring case 4.

As shown in FIGS. 4–6, first end 2a and second end 2b of electrical wire 2 are introduced into opening 4a through holes 1a and 1b formed on an end surface of ring member 1 and are extended into connector 5 through a pair of penetrating holes $5a_4$, which are formed through projection portion $5a_3$. A contact 12 having a first electric connection is connected to an end of second lead 6b, which is inserted into connector 5. In addition, contact 12 having a second electric connection is connected to an end of first lead 6a, which is inserted into connector 5. First end 2a of electrical wire 2 is disposed between a first receiving portion formed at case 5a of connector 5 and a second receiving portion formed at contact 12, which is connected to first lead 6a. Second end 2b of electrical wire 2 is disposed between a third receiving portion formed at case 5a of connector 5 and a fourth receiving portion formed at contact 12, which is connected to second lead 6b. Thus, first end 2a and second end 2b of electrical wire 2 are connected to first lead 6a and second lead 6b, respectively.

Coil bobbin 3 is fixed to ring case 4 by a resin 13 (e.g., epoxy resin) which is poured into ring case 4 from an open end of the annular groove of ring case 4. O-ring 11, which is disposed between case 5a and the closed end of ring case 4, prevents resin 13 from leaking to the outside of the closed end surface of ring case 4 through the gap between projection portion $5a_3$ of case 5a and a surrounding wall of opening 4a, when resin 13 is poured into ring case 4.

In the known electromagnet assembly 7 for use in an electromagnetic apparatus, it is necessary to secure first hooks 10a to ring-shaped plate 10 and to equip O-ring 11 when connector 5 is fixed to ring case 4. As a result, the efficiency during manufacturing of fixing connector 5 to ring case 4 may be reduced.

SUMMARY OF THE INVENTION

A need has arisen to provide an electromagnet assembly for use in an electromagnetic apparatus which has a greater manufacturing efficiency in fixing a connector to a ring case, when compared with a known electromagnet assembly.

In an embodiment of the present invention, an electromagnet assembly for an electromagnetic apparatus comprises a ring member, a coil bobbin, a ring case, and a connector. The ring member comprises a tubular spool, e.g., a cylindrical spool, with a pair of annular flanges projecting radially from the spool. The coil bobbin comprises the ring member and an electrical wire. The electrical wire is wound around the spool between the flanges. The ring case comprises an annular groove, which has an open edge. The coil bobbin is disposed in the ring case's annular groove. An opening is formed through the ring case adjacent to its closed end surface. A connector is disposed on the ring case adjacent to its closed end surface, such that the connector covers the opening. A first end and a second end of the electrical wire and a first lead wire and a second lead wire of an electric circuit are connected, respectively in the connector. A projection portion formed on the connector is inserted into the opening and is fixed adhesively to an end surface of the ring member.

In another embodiment of the present invention, an electromagnet assembly for an electromagnetic apparatus comprises a ring member, a coil bobbin, a ring case, and a connector. The ring member comprises a tubular spool, e.g., a cylindrical spool, with a pair of annular flanges projecting radially from the spool. The coil bobbin comprises the ring member and an electrical wire. The electrical wire is wound around the spool between the flanges. The ring case comprises an annular groove, which has an open edge. The coil bobbin is disposed in the ring case's annular groove. An opening is formed through the ring case adjacent to its closed end surface. A connector is disposed on the ring case adjacent to its closed end surface, such that the connector covers the opening. A first end and a second end of the electrical wire and a first and a second lead wire of an electric circuit are connected, respectively in the connector. A projection portion formed on an end surface of the ring member of the coil bobbin is inserted into the opening and is fixed adhesively to the connector.

Objects, features, and advantages will be apparent to persons of ordinary skill in the art from the following detailed description of the invention and the accompanying drawings.

BRIEF DESCRIPTION OF THE DRAWINGS

The present invention may be more readily understood with reference to the following drawings.

DETAILED DESCRIPTION OF PREFERRED EMBODIMENTS

Referring to FIGS. 7–10, a first embodiment of the present invention of an electromagnet assembly for use in an electromagnetic apparatus is shown. In the following explanation and FIGS. 7–10, the same reference numbers are used to represent the same parts of an electromagnet assembly for use in an electromagnetic apparatus as shown in FIGS. 1–6. Therefore, further explanation of similar parts is here omitted.

Figure 1:
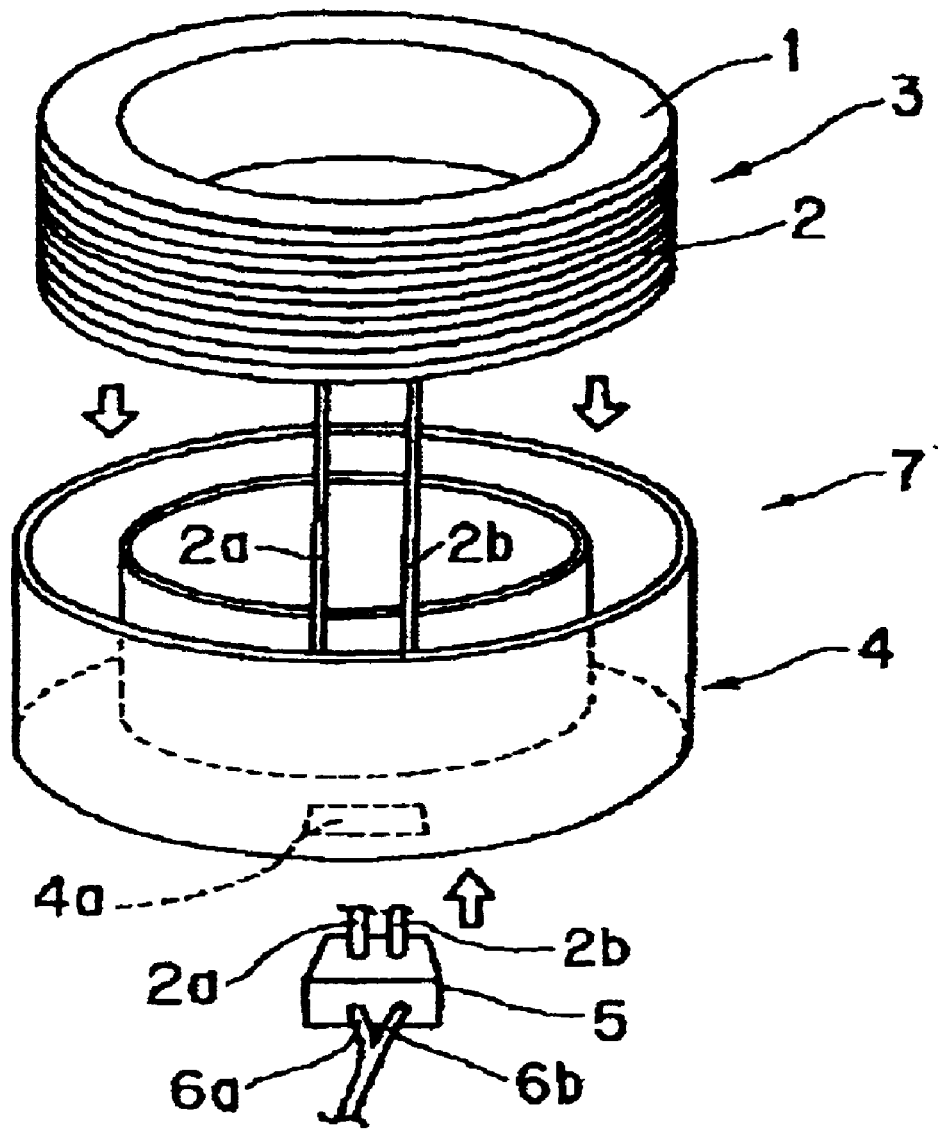
FIG. 1 is a perspective and exploded view of a known electromagnet assembly for use in an electromagnetic apparatus.
Figure 2:
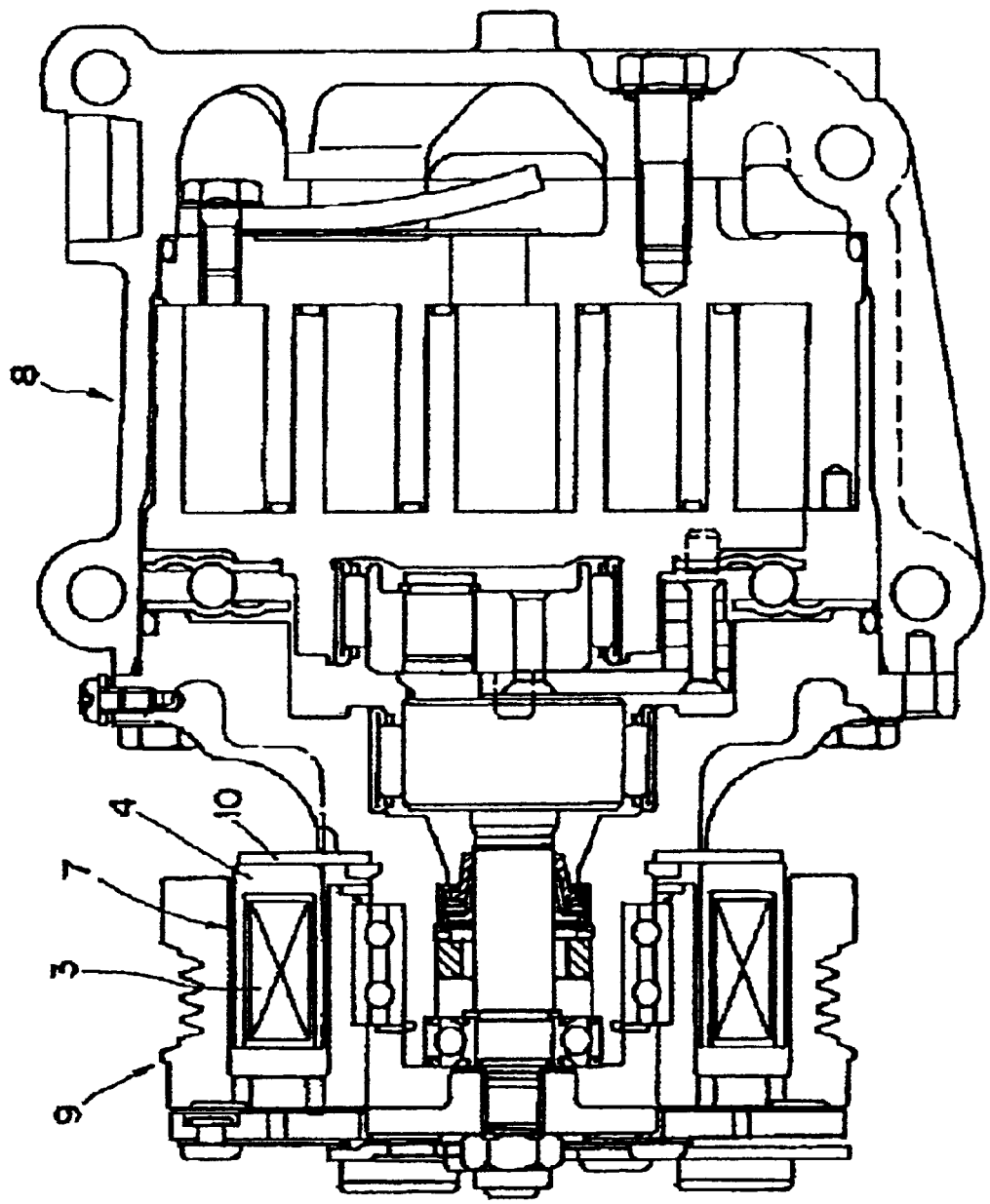
FIG. 2 is a longtitudial, cross-sectional view of a known compressor for use in an automotive air-conditioning system which includes an electromagnetic clutch having the known electromagnet assembly.
Figure 3:
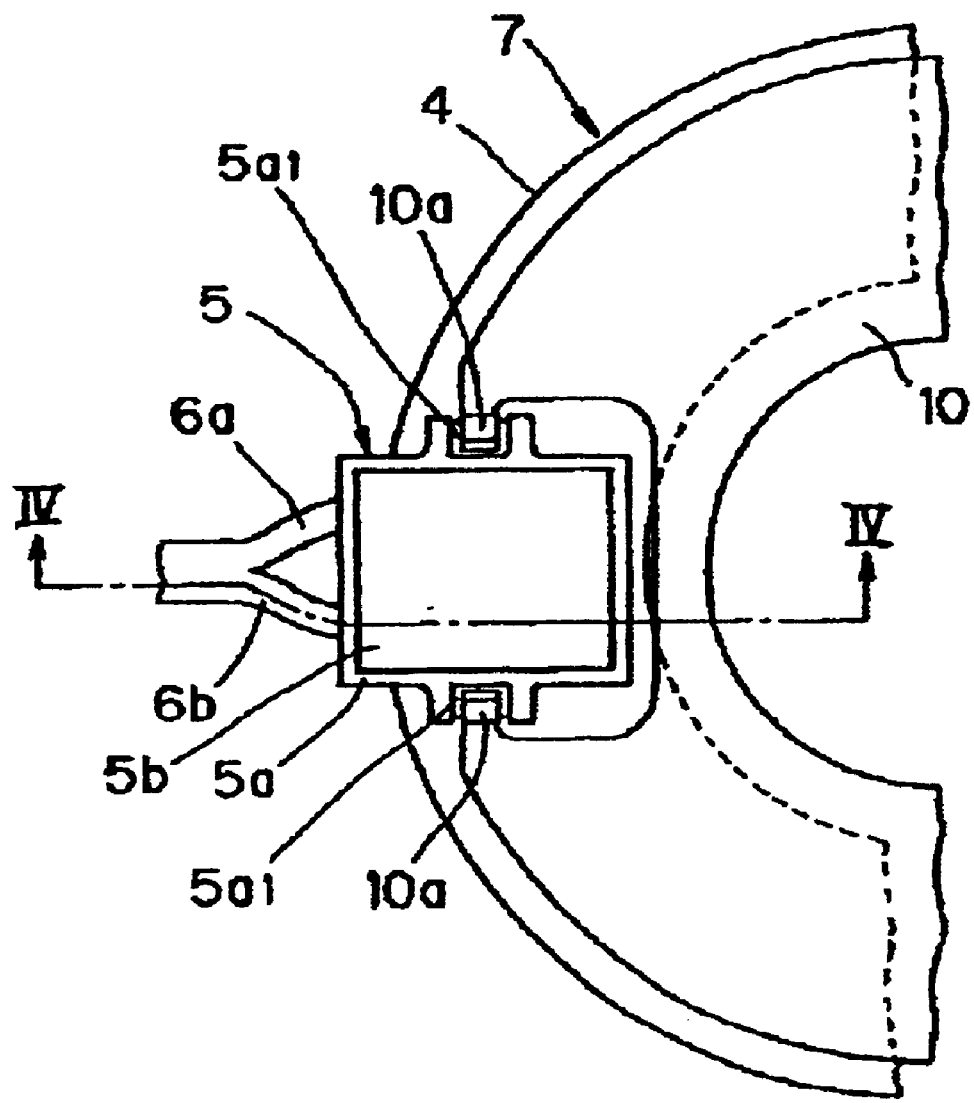
FIG. 3 is a plan view of a closed end side of a ring case of the known electromagnet assembly.
Figure 4:
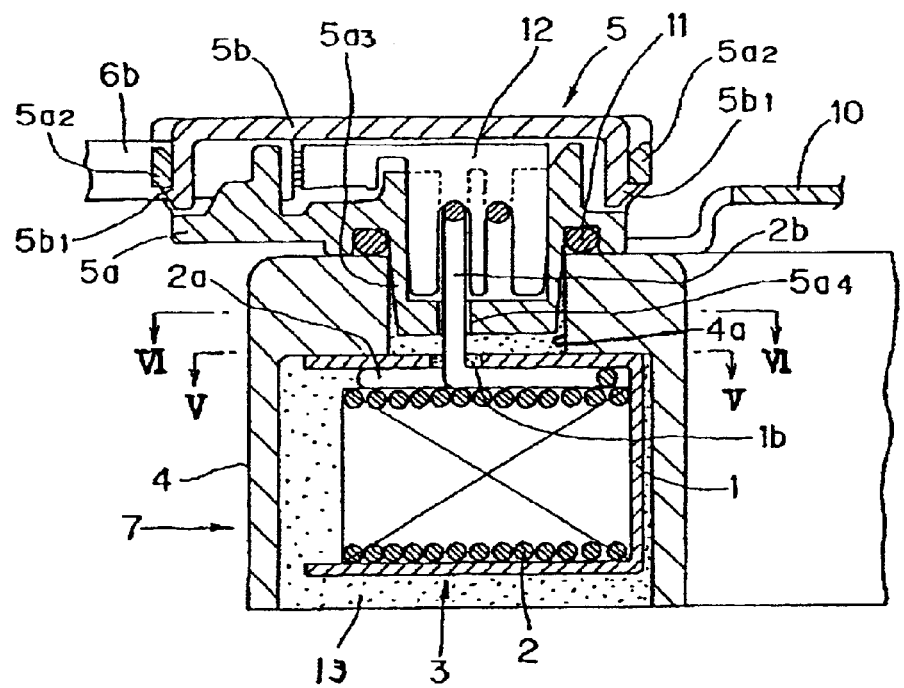
FIG. 4 is a cross-sectional view taken along the line IV—IV of FIG. 3.
Figure 5:
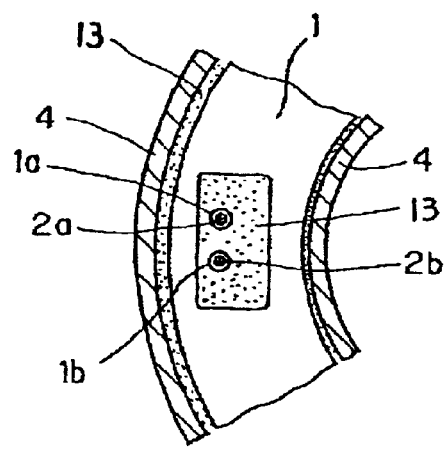
FIG. 5 is a cross-sectional view taken along the line V—V of FIG. 4.
Figure 6:
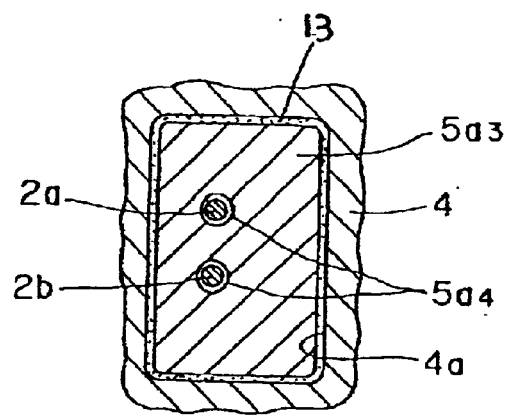
FIG. 6 is a cross-sectional view taken along the line VI—VI of FIG. 4.
Figure 7:
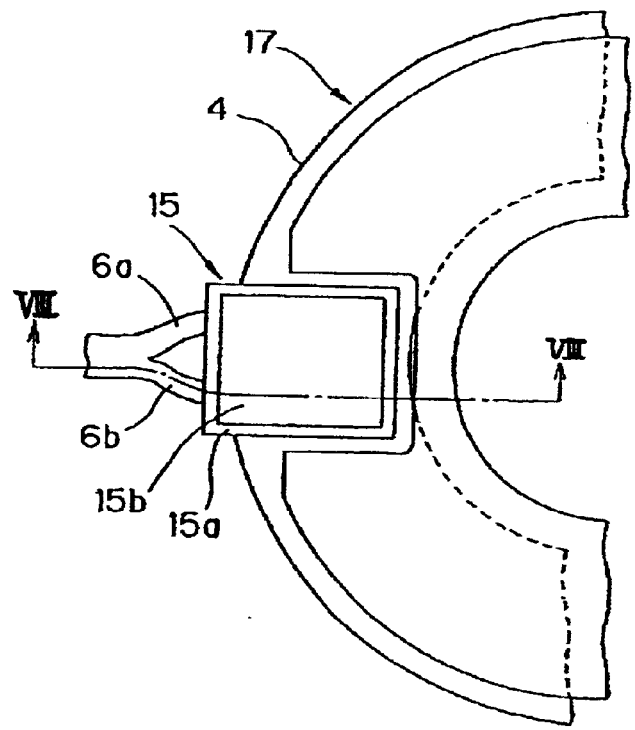
FIG. 7 is a plan view of a closed end side of a ring case of an electromagnet assembly for use in an electromagnetic apparatus, according to a first embodiment of the present invention.
Figure 8:
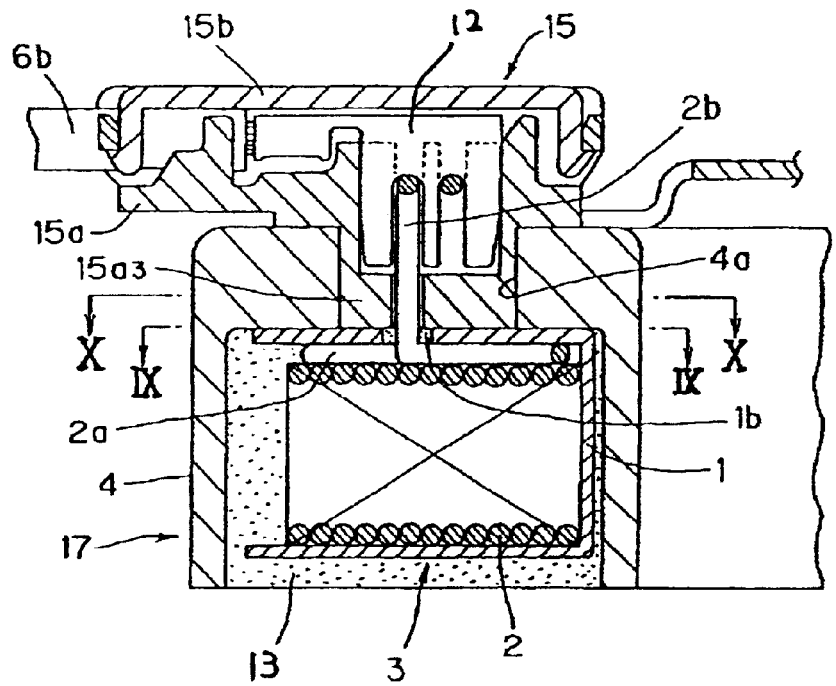
FIG. 8 is a cross-sectional view taken along the line VIII—VIII of FIG. 7.
Figure 9:
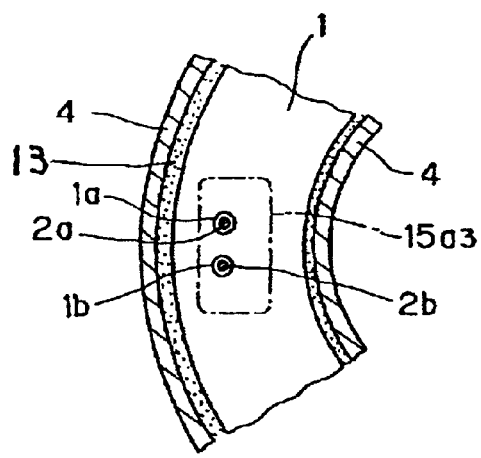
FIG. 9 is a cross-sectional view taken along the line IX—IX of FIG. 8.
Figure 10:
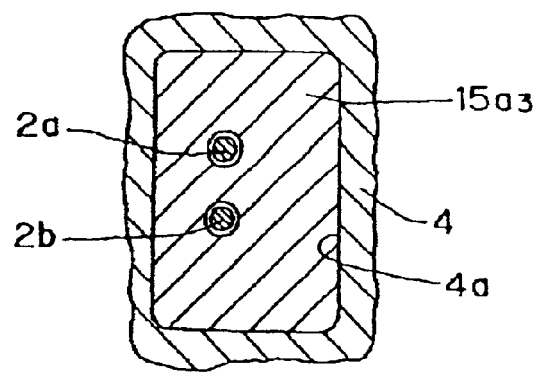
FIG. 10 is a cross-sectional view taken along the line X—X of FIG. 8.

In an electromagnet assembly 17, according to this embodiment, a projection portion $15a_3$ is formed on a case 15a of a connector 15, is pressedly fitted into an opening 4a formed through a ring case 4 adjacent to its closed end surface, and is fixed to an end surface of ring member 1 of a coil bobbin 3, e.g., by high frequency adhesion or ultrasonic adhesion or the like. Connector 15 is fixed to ring case 4 by which projection portion $15a_3$ of case 15a of connector 15 is fixed adhesively to the end surface of ring member 1 of coil bobbin 3. Coil bobbin 3 is fixed within ring case 4 by resin, e.g., epoxy resin. A bottom surface of case 15a of connector 15 surrounds opening 4a and abuts ring case 4 adjacent to its closed end surface. Hooks 10a and an O-ring 11 of the known electromagnet assembly 7, which are shown in FIGS. 3 and 4, are not part of electromagnet assembly 17. The structure of electromagnet assembly 17 is substantially the same as the known electromagnet assembly 7, except as described above.

In electromagnet assembly 17 for use in the electromagnetic apparatus, the engaging process for fixing a connector to a ring case is no longer necessary. Therefore, the manufacturing efficiency of fixing the connector to the ring case in the present invention may be increased compared with that of known electromagnet assemblies. Further, in electromagnet assembly 17, there is no gap between a side surface of projection portion $15a_3$ of case 15a of connector 15 and an annular wall of opening 4a formed through ring case 4 adjacent to its closed end surface because projection portion $15a_3$ of connector 15 is pressedly fitted into opening 4a of ring case 4. Consequently, this structure prevents the leakage of resin 13 to the outside of the closed end surface of ring case 4 through opening 4a when resin 13 is poured into ring case 4. As a result, in electromagnet assembly 17, the manufacturing process for placing of O-ring 11 of known electromagnet assembly 7 is no longer necessary, and the manufacturing efficiency of fixing a connector to a ring case in the present invention may be increased compared with that of known electromagnet assemblies. Further, because the number of parts of electromagnet assembly 17 is reduced compared with the known electromagnet assembly, the manufacturing cost of electromagnet assembly 17 may be reduced compared with that of known electromagnet assemblies.

Figure 11:
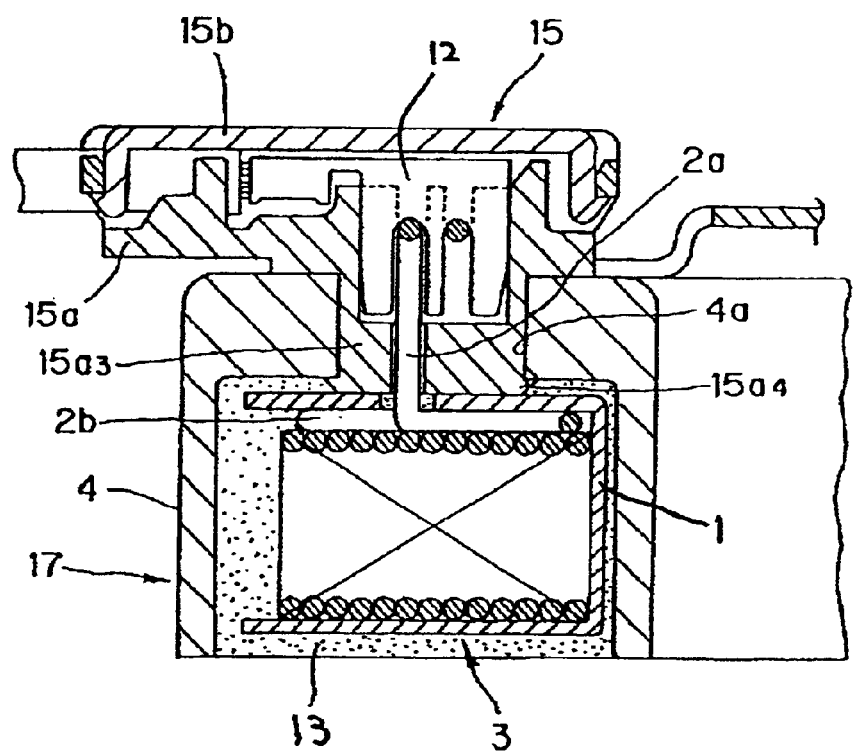
FIG. 11 is a cross-sectional view, which corresponds to FIG. 8, of an electromagnet assembly for use in an electromagnetic apparatus, according to a first alternative of the first embodiment of the present invention.

Referring to FIG. 11, in a first alternative to the first embodiment of the present invention, hook portion $15a_4$ may be formed around a tip portion of projection portion $15a_3$, and hook portion $15a_4$ may be pressedly fitted into opening $4a$ formed through ring case 4 adjacent to its closed end surface and may engage a rim of opening $4a$. As a result, hook portion $15a_4$ closes the entrance of the gap between the side surface of projection portion $15a_3$ of connector 15 and an annular wall of opening $4a$, and when resin 13 is poured into ring case 4, the leakage of resin 13 to the outside of the closed end surface of ring case 4 through opening $4a$ may be prevented. Further, in the first embodiment of the present invention, a bond may be coated to the side surface of projection portion $15a_3$, and the side surface of projection portion $15a_3$ may be fixed adhesively to the annular wall of opening $4a$. As a result, the gap between the side surface of projection portion $15a_3$ and the annular wall of opening $4a$ is closed by the bond, and when resin 13 is poured into ring case 4, the leakage of resin 13 to the outside of the closed end surface of ring case 4 through opening $4a$ may be prevented.

Figure 12:
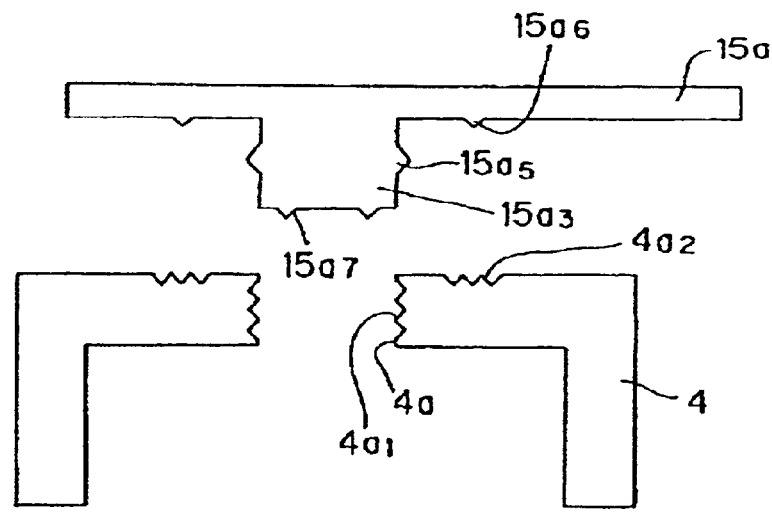
FIGS. 12 and 13 are cross-sectional views, which correspond to FIG. 8, of an electromagnet assembly for use in an electromagnetic apparatus, according to a second alternative of the first embodiment of the present invention.
Figure 13:
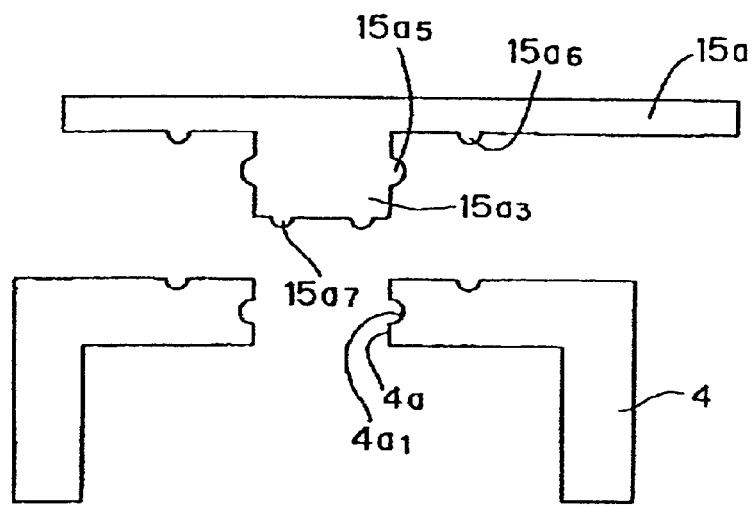

Referring to FIGS. 12 and 13, in a second alternative to the first embodiment of the present invention, a second projection portion $15a_5$ may be formed around a first projection portion $15a_3$ of case $15a$ of connector 15, and second projection portion $15a_5$ may engage a concave portion $4a_1$ formed around the annular wall of opening $4a$ of ring case 4. Second projection portion $15a_5$ of case $15a$ may be fixed to concave portion $4a_1$ formed around the annular wall of opening $4a$ of ring case 4, e.g., by high frequency adhesion or ultrasonic adhesion or the like. An annular projection portion $15a_6$ may be formed on the first end surface of case $15a$, and annular projection portion $15a_6$ may engage an annular concave portion $4a_2$ formed on the closed end surface of ring case 4. Annular projection portion $15a_6$ of case $15a$ is fixed to annular concave portion $4a_2$ formed on the closed end surface of ring case 4, e.g., by high frequency adhesion or ultrasonic adhesion or the like. A plurality of third projection portions $15a_7$ may be formed on the tip portion of first projection portion $15a_3$ of case $15a$, and the plurality of third projection portions $15a_7$ may abut the end surface of ring member 1. The plurality of third projection portions $15a_7$ of the tip portion of first projection portion $15a_3$ of case $15a$ may be fixed to the end surface of ring member 1, e.g., by high frequency adhesion or ultrasonic adhesion or the like. As shown in FIGS. 12 and 13, second projection portion $15a_5$, concave portion $4a_1$, annular projection portion $15a_6$, annular concave portion $4a_2$, and third projection portions $15a_7$ may have a variety of cross-sectional shapes. As a result, in electromagnet assembly 17, the manufacturing process for placing of O-ring 11 of known electromagnet assembly 7, and the engaging process for fixing connector 15 to ring case 4 are no longer necessary, and the manufacturing efficiency of fixing a connector to a ring case in the present invention may be increased compared with that of known electromagnet assemblies. Further, in this alternative to the first embodiment, second projection portion $15a_5$ may be formed by a concave portion, and concave portion $4a_1$ may be formed by a projection portion, which engages second portion $15a_5$. Annular projection portion $15a_6$ may be formed by a annular concave portion, and annular concave portion $4a_2$ may be formed by an annular projection portion, which engages annular portion $15a_6$.

Figure 14:
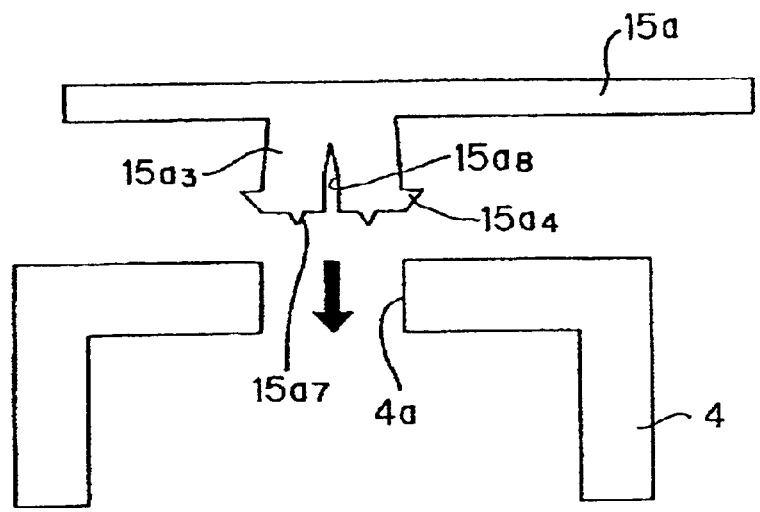
FIG. 14 is a cross-sectional view, which corresponds to FIG. 8, of an electromagnet assembly for use in an electromagnetic apparatus, according to a third alternative of the first embodiment of the present invention.

Referring to FIG. 14, in a third alternative to the first embodiment of the present invention, a notched portion $15a_8$ may be formed at first projection portion $15a_3$ of case $15a$ of connector 15, and first projection portion $15a_3$ may be pressedly fitted into opening $4a$ formed through ring case 4 adjacent to its closed end surface. Hook portion $15a_4$ may be formed around a tip portion of first projection portion $15a_3$, and may engage a rim of opening $4a$ of ring case 4. A plurality of third projection portions $15a_7$ may be formed on the tip portion of first projection portion $15a_3$ of case $15a$, and the plurality of third projection portions $15a_7$ may abut the end surface of ring member 1. First projection portion $15a_3$ of case $15a$ of connector 15 may be fixed to the end surface of ring member 1, e.g., by high frequency adhesion or ultrasonic adhesion or the like. Moreover, a plurality of concave portion may be formed on the end surface of ring member 1, and may engage the plurality of third projection portions $15a_7$. As a result, in electromagnet assembly 17, the manufacturing process for placing of O-ring 11 of known electromagnet assembly 7, and the engaging process for fixing connector 15 to ring case 4 are no longer necessary, and the manufacturing efficiency of fixing a connector to a ring case in the present invention may be increased compared with that of known electromagnet assemblies.

Figure 15:
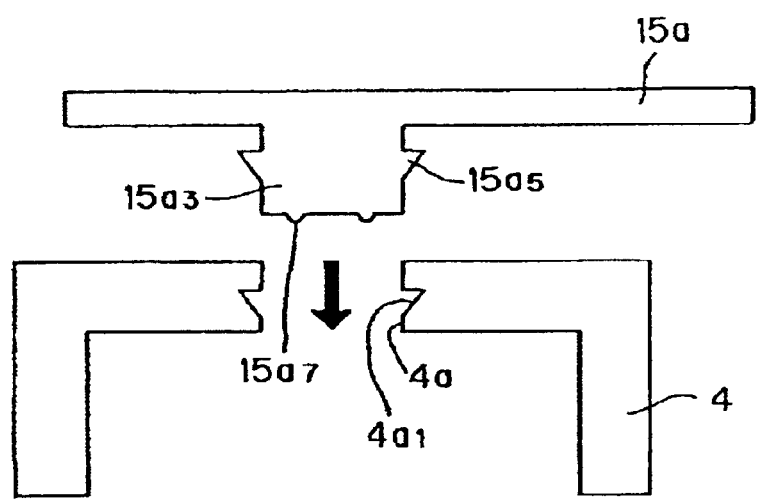
FIG. 15 is a cross-sectional view, which corresponds to FIG. 8, of an electromagnet assembly for use in an electromagnetic apparatus, according to a fourth alternative of the first embodiment of the present invention.

Referring to FIG. 15, in a fourth alternative to the first embodiment of the present invention, a second projection portion $15a_5$ may be formed around first projection portion $15a_3$ of case $15a$ of connector 15. A concave portion $4a_1$ may be formed around the annular wall of opening $4a$ formed through ring case 4 adjacent to its closed end surface. First projection portion $15a_3$ of case $15a$ is pressedly fitted into opening $4a$, and second projection portion $15a_5$ may engage concave portion $4a_1$ of ring case 4. A plurality of third projection portions $15a_7$ may be formed on the tip portion of first projection portion $15a_3$ of case $15a$, and may abut the end surface of ring member 1. First projection portion $15a_3$ of case $15a$ may be fixed to the end surface of ring member 1, e.g., by high frequency adhesion or ultrasonic adhesion or the like. Moreover, a plurality of concave portion may be formed on the end surface of ring member 1, and may engage the plurality of third projection portions $15a_7$. As a result, in electromagnet assembly 17, the manufacturing process for placing of O-ring 11 of known electromagnet assembly 7, and the engaging process for fixing connector 15 to ring case 4 are no longer necessary, and the manufacturing efficiency of fixing a connector to a ring case in the present invention may be increased compared with that of known electromagnet assemblies. Further, in this alternative to the first embodiment, second projection portion $15a_5$ may be formed by a concave portion, and concave portion $4a_1$ may be formed by a projection portion, which engages second projection portion $15a_5$.

Figure 16:
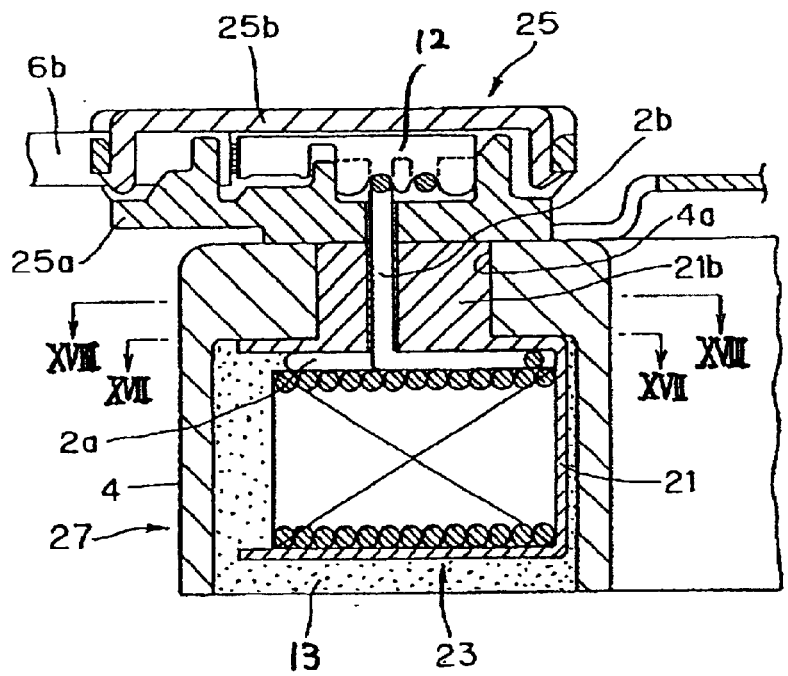
FIG. 16 is a cross-sectional view, which corresponds to FIG. 8, of an electromagnet assembly for use in an electromagnetic apparatus, according to a second embodiment of the present invention.
Figure 17:
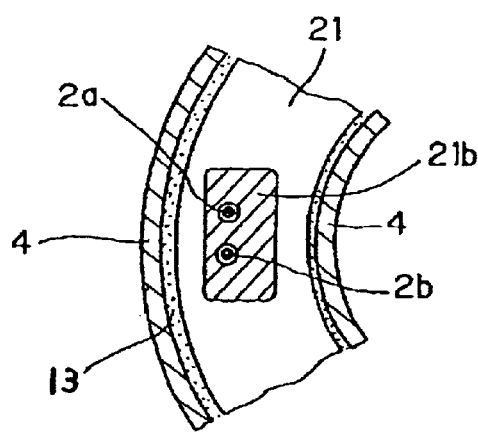
FIG. 17 is a cross-sectional view taken along the line XVII—XVII of FIG. 16.
Figure 18:
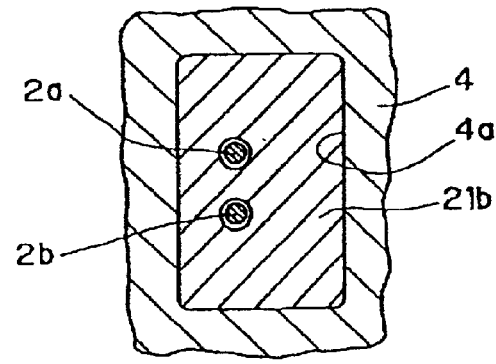
FIG. 18 is a cross-sectional view taken along the line XVIII—XVIII of FIG. 16.

Referring to FIGS. 16–18, a second embodiment of the present invention of an electromagnet assembly for use in an electromagnetic apparatus is shown. In the following explanation and FIGS. 16–18, the same reference numbers are used to represent the same parts of electromagnet assembly 7 as shown in FIGS. 1–6. Therefore, further explanation of similar parts here is omitted.

In electromagnet assembly 27, according to this embodiment, a projection portion $21b$, is formed on an end surface of a ring member 21 of a coil bobbin 23, is pressedly fitted into an opening $4a$ formed through a ring case 4 adjacent to its closed end surface, and is fixed to a case $25a$ of a connector 25, e.g., by high frequency adhesion or ultrasonic adhesion or the like. Connector 25 is fixed to ring case 4 by which case $25a$ is fixed adhesively to projection portion $21b$ formed on the end surface of a ring member 21 of a coil bobbin 23. Coil bobbin 23 is fixed within ring case 4 by resin, e.g., epoxy resin. A bottom surface of case 25a of connector 25 surrounds opening 4a and abuts ring case 4 adjacent to its closed end surface. Hooks 10a and an O-ring 11 of the known electromagnet assembly, which are shown in FIGS. 3 and 4, are not part of electromagnet assembly 27. The structure of electromagnet assembly 27 is substantially the same as the known electromagnet assembly 7, except as described above.

In electromagnet assembly 27, the engaging process for fixing connector 25 to ring case 4 is no longer necessary. Therefore, the manufacturing efficiency of fixing a connector to a ring case in the present invention may be increased compared with that of known electromagnet assemblies. Further, in electromagnet assembly 27, projection portion 21b, which is formed on an end surface of a ring member 21 of a coil bobbin 23, is pressedly fitted into an opening 4a formed through a ring case 4 adjacent to its closed end surface, and is fixed to a case 25a of a connector 25. Consequently, this structure prevents the leakage of resin 13 to the outside of the closed end surface of ring case 4 through opening 4a when resin 13 is poured into ring case 4, because there is no gap between the side surface of projection portion 21b and the annular wall of opening 4a. As a result, in electromagnet assembly 27, the manufacturing process for placing of O-ring 11 of known electromagnet assembly 7 is no longer necessary, and the manufacturing efficiency of fixing a connector to a ring case in the present invention may be increased compared with that of known electromagnet assemblies. Further, because the number of parts of electromagnet assembly 27 is reduced compared with known electromagnet assemblies, the manufacturing cost of electromagnet assembly 27 may be reduced compared with that of known electromagnet assemblies. Moreover, in the second embodiment of the present invention, a bond may be coated to the side surface of projection portion 21b, and the side surface of projection portion 21b may be fixed adhesively to the annular wall of opening 4a. As a result, the gap between the side surface of projection portion 21b and the annular wall of opening 4a is closed by the bond, and when resin 13 is poured into ring case 4, the leakage of resin 13 to the outside of the closed end surface of ring case 4 through opening 4a may be prevented.

Figure 19:
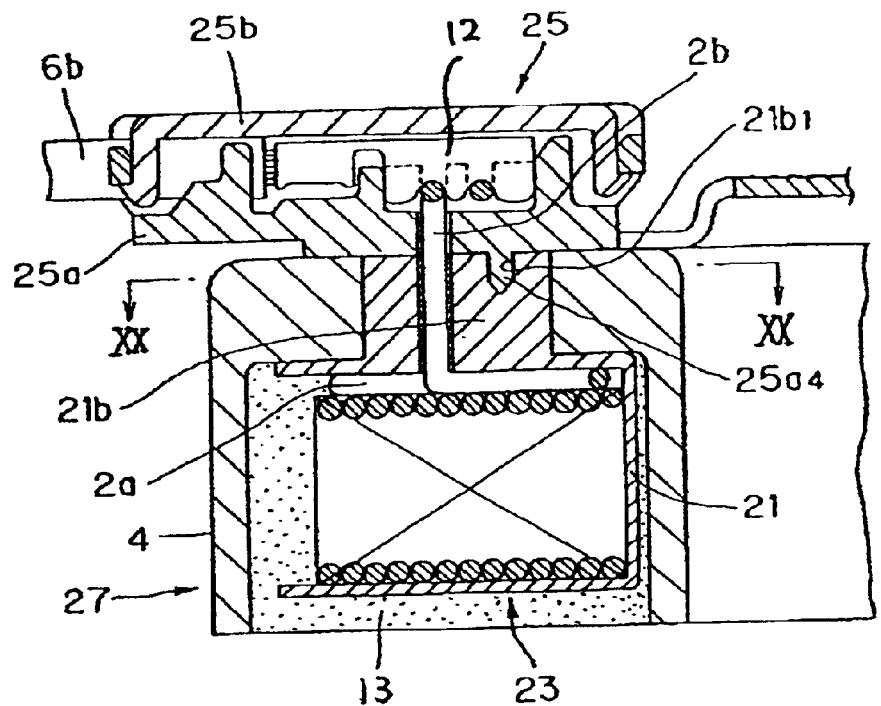
FIG. 19 is a cross-sectional view, which corresponds to FIG. 16, of an electromagnet assembly for use in an electromagnetic apparatus, according to a first alternative of the second embodiment of the present invention.
Figure 20:
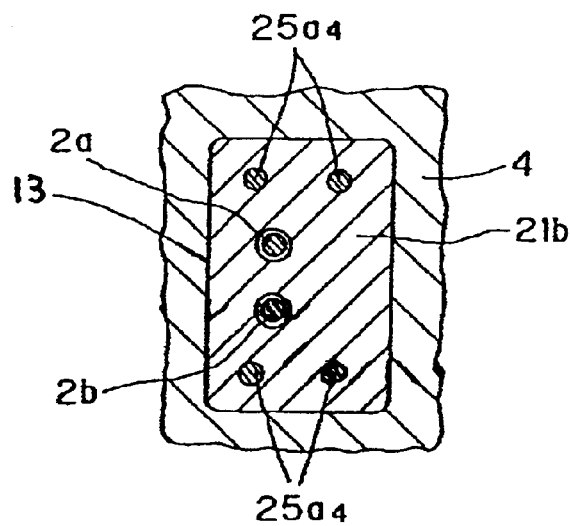
FIG. 20 is a cross-sectional view taken along the line XX—XX of FIG. 19.

Referring to FIGS. 19 and 20, in a first alternative to the second embodiment of the present invention, a projection portion $25a_4$ is formed on case 25a of connector 25 and may be fitted into a concave portion $21b_1$, which is formed on a first projection portion 21b of coil bobbin 23. As a result, adhesion surfaces between projection portion 21b and case 25a are increased, and the strength with which connector 25 is fixed to ring case 4, may be increased. Projection portion $25a_4$ may have a variety of cross-sectional shapes. Moreover, projection portion $25a_4$ may be a single projection or a plurality of projections.

Figure 21:
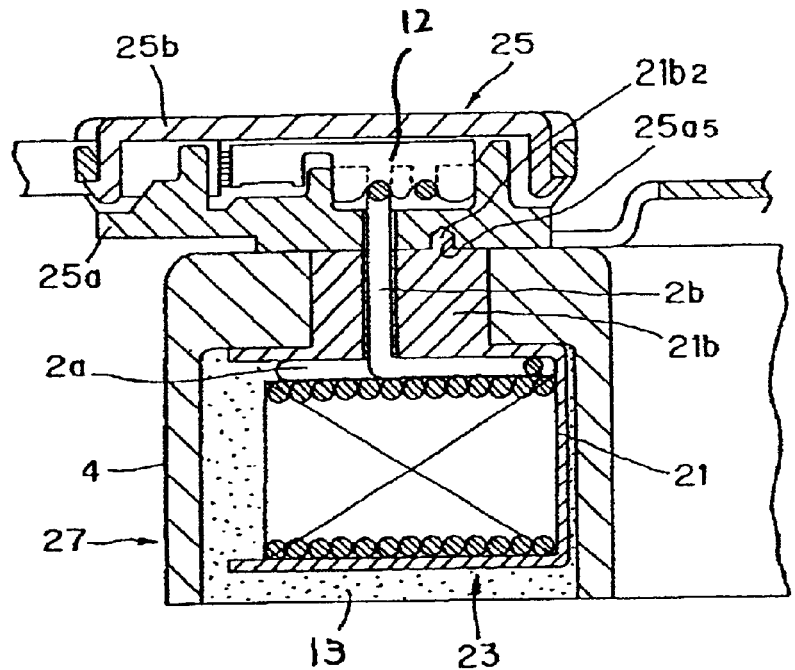
FIG. 21 is a cross-sectional view, which corresponds to FIG. 16, of an electromagnet assembly for use in an electromagnetic apparatus, according to a second alternative of the second embodiment of the present invention.

Referring to FIG. 21, in a second alternative to the second embodiment of the present invention, a second projection portion $21b_2$ is formed on a tip portion of a first projection portion 21b and may be fitted into a concave portion $25a_5$, which is formed on case 25a of connector 25. As a result, adhesion surfaces of between projection portion 21b and case 25a are increased, and the strength with which connector 25 is fixed to ring case 4, may be increased. Second projection portion $21b_2$ may have a variety of cross-sectional shapes. Moreover, second projection portion $21b_2$ may be a single projection or a plurality of projections.

Figure 22:
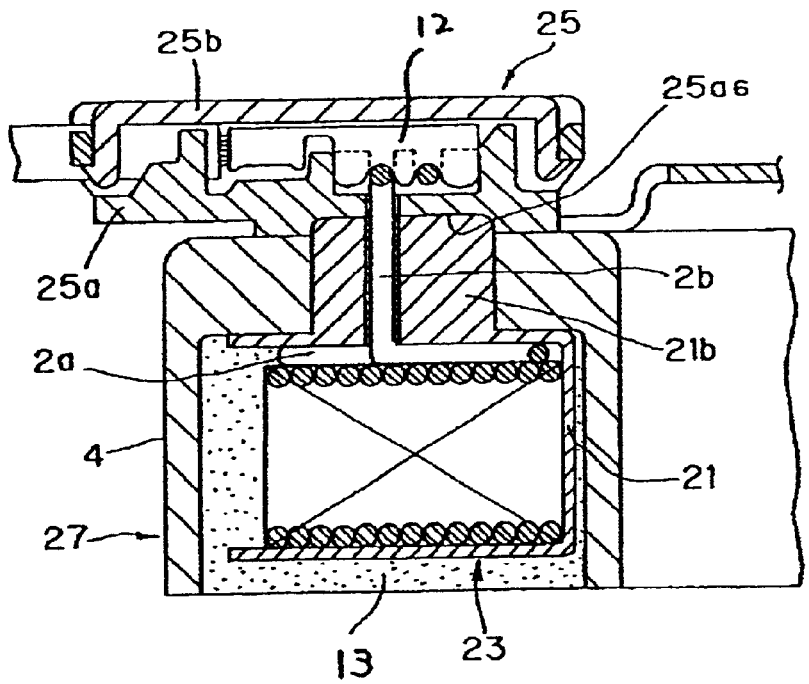
FIG. 22 is a cross-sectional view, which corresponds to FIG. 16, of an electromagnet assembly for use in an electromagnetic apparatus, according to a third alternative of the second embodiment of the present invention.

Referring to FIG. 22, in a third alternative to the second embodiment of the present invention, a tip portion of first projection portion 21b of coil bobbin 23 may be fitted into a concave portion $25a_6$ formed on case 25a of connector 25. As a result, adhesion surfaces between projection portion 21b and case 25a are increased, and the strength with which connector 25 is fixed to ring case 4, may be increased.

Figure 23:
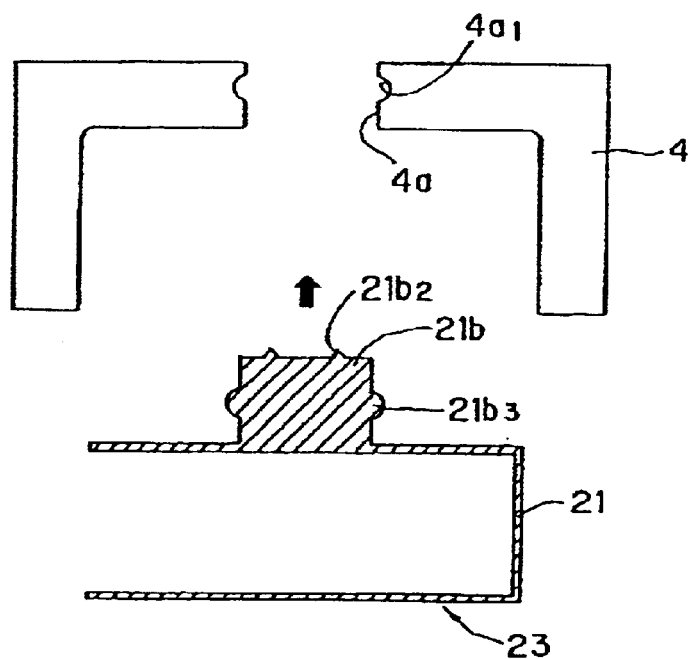
FIGS. 23 and 24 are cross-sectional views, which correspond to FIG. 16, of an electromagnet assembly for use in an electromagnetic apparatus, according to a fourth alternative of the second embodiment of the present invention.
Figure 24:
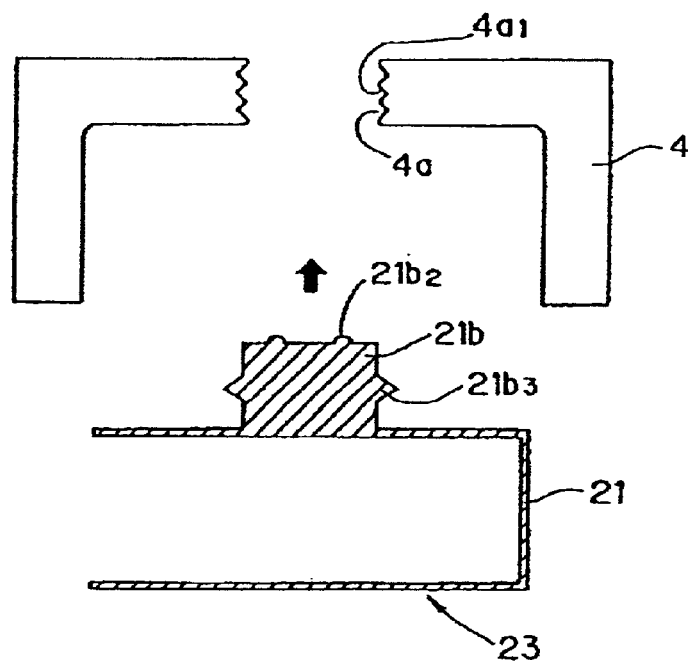

Referring to FIGS. 23 and 24, in a fourth alternative to the second embodiment of the present invention, a second projection portion $21b_3$ may be formed around a first projection portion 21b of ring member 21 of coil bobbin 23, and a concave portion $4a_1$ may be formed around the annular wall of opening 4a of ring case 4. Second projection portion $21b_3$ of ring member 21 of coil bobbin 23 may engage a concave portion $4a_1$ of opening 4a of ring case 4, and ring member 21 of coil bobbin 23 may be fixed to ring case 4, e.g., by high frequency adhesion or ultrasonic adhesion or the like. A plurality of third projection portions $21b_2$ may be formed on a tip portion of first projection portion 21b of ring member 21 of coil bobbin 23, and a plurality of concave portions $25a_5$ may be formed on the first end surface of case 25a of connector 25. The plurality of third projection portions $21b_2$ may engage the plurality of concave portions $25a_5$ of the first end surface of case 25a of connector 25, and coil bobbin 23 may be fixed to case 25a of connector 25, e.g., by high frequency adhesion or an ultrasonic adhesion or the like. As a result, in electromagnet assembly 27, the manufacturing process for placing of O-ring 11 of known electromagnet assembly 7, and the engaging process for fixing connector 25 to ring case 4 are no longer necessary, and the manufacturing efficiency of fixing a connector to a ring case in the present invention may be increased compared with that of known electromagnet assemblies. As shown in FIGS. 23 and 24, second projection portion $21b_3$, concave portion $4a_1$, third projection portions $21b_2$, and concave portions $25a_5$ may have a variety of cross-sectional shapes. Further, in this alternative to the second embodiment, second projection portion $21b_3$ may be formed by a concave portion, and concave portion $4a_1$ may be formed by a projection portion, which engages projection portion $21b_3$. Third projection portions $21b_2$ may be formed by concave portions, and concave portions $25a_5$ may be formed by projection portions, which engage third projection portions $21b_2$.

Figure 25:
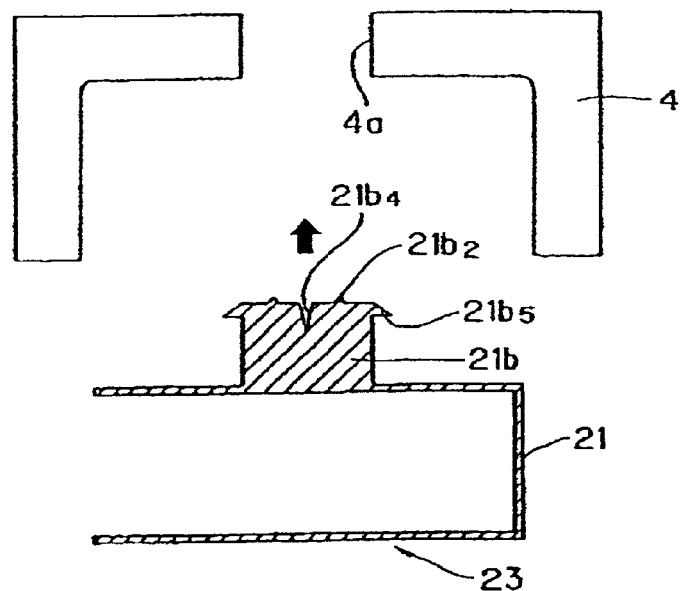
FIG. 25 is a cross-sectional view, which corresponds to FIG. 16, of an electromagnet assembly for use in an electromagnetic apparatus, according to a fifth alternative of the second embodiment of the present invention.

Referring to FIG. 25, in a fifth alternative to the second embodiment of the present invention, a notched portion $21b_4$ may be formed at first projection portion 21b of ring member 21 of coil bobbin 23, and first projection portion 21b may be pressedly fitted into opening 4a formed through ring case 4 adjacent to its closed end surface. A hook portion $21b_5$ may be formed around a tip portion of first projection portion 21b, and may engage a rim of opening 4a of ring case 4. A plurality of second projection portions $21b_2$ may be formed on the tip portion of first projection portion 21b of ring member 21 of coil bobbin 23, and the plurality of second projection portions $21b_2$ may engage a plurality of concave portions $25a_5$, which may be formed on the first end surface of case 25a of connector 25. Case 25a of connector 25 may be fixed to ring member 21 of coil bobbin 23, e.g., by high frequency adhesion or ultrasonic adhesion or the like. As a result, in electromagnet assembly 27, the manufacturing process for placing of O-ring 11 of known electromagnet assembly 7, and the engaging process for fixing connector 25 to ring case 4 are no longer necessary, and the manufacturing efficiency of fixing a connector to a ring case in the present invention may be increased compared with that of known electromagnet assemblies. Second projection portions $21b_2$ and concave portions $25a_5$ may have a variety of cross-sectional shapes.

Figure 26:
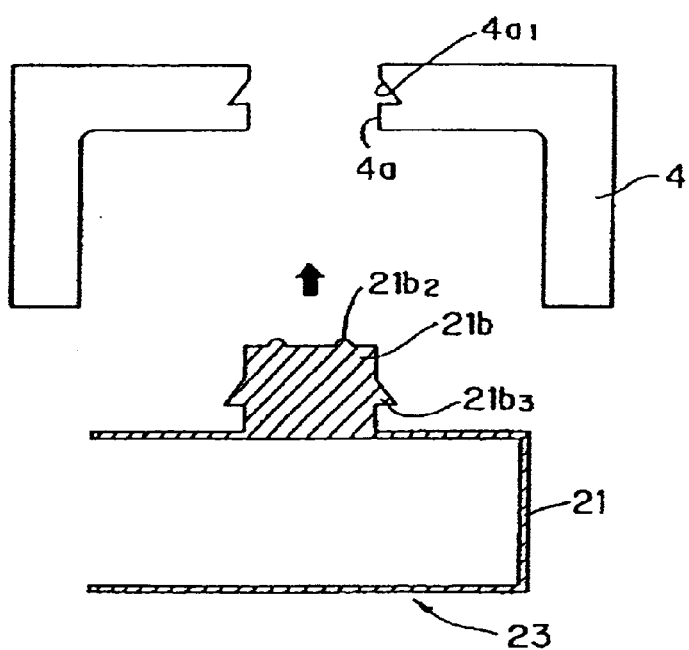
FIG. 26 is a cross-sectional view, which corresponds to FIG. 16, of an electromagnet assembly for use in an electromagnetic apparatus, according to a sixth alternative of the second embodiment of the present invention.

Referring to FIG. 26, in a sixth alternative to the second embodiment of the present invention, a second projection portion $21b_3$ may be formed around first projection portion $21b$ of ring member 21 of coil bobbin 23. A concave portion $4a_1$ may be formed around the annular wall of opening $4a$ formed through ring case 4 adjacent to its closed end surface. First projection portion $21b$ is pressedly fitted into opening $4a$, and second projection portion $21b_3$ may engage concave portion $4a_1$ of ring case 4. A plurality of third projection portions $21b_2$ may be formed on the tip portion of first projection portion $21b$ of ring member 21 of coil bobbin 23, and may engage a plurality of concave portions $25a_5$, which may be formed on the first end surface of case $25a$ of connector 25. Case $25a$ of connector 25 may be fixed to first projection portion $21b$ of ring member 21 of coil bobbin 23, e.g., by high frequency adhesion or ultrasonic adhesion or the like. As a result, in electromagnet assembly 27, the manufacturing process for placing of O-ring 11 of known electromagnet assembly 7, and the engaging process for fixing connector 25 to ring case 4 are no longer necessary, and the manufacturing efficiency of fixing a connector to a ring case in the present invention may be increased compared with that of known electromagnet assemblies. Further, in this alternative to the second embodiment, second projection portion $21b_3$ may be formed by a concave portion, and concave portion $4a_1$ may be formed by a projection portion, which engages second projection portion $21b_3$. Similarly, third projection portions $21b_2$ may be formed by convex portions, and concave portions $25a_5$ may be formed by projection portions, which engage third projection portions $21b_2$. Moreover, second projection portion $21b_3$, concave portion $4a_1$, third projection portions $21b_2$, and concave portions $25a_5$ may have a variety of cross-sectional shapes.

As described above, with respect to embodiments of the present invention of an electromagnet assembly for use in an electromagnetic apparatus, a projection portion formed on a connector is inserted into an opening formed through a ring case adjacent to its closed end surface. The connector is fixed adhesively to an end surface of a ring member of a coil bobbin, or a projection portion formed on an end surface of a ring member of a coil bobbin is inserted into an opening formed through a ring case adjacent to its closed end surface. If the ring member is inserted into an opening, it may be fixed adhesively to a case of a connector. As a result, the connector is fixed to the coil bobbin, which is fixed to the ring case, without an engaging process, and the connector is fixed to the ring case. Therefore, the engaging process is no longer necessary, and the manufacturing efficiency of fixing the connector to the ring case may be increased as compared with that of a known electromagnet assemblies.

Although the present invention has been described in connection with preferred embodiments, the invention is not limited thereto. It will be understood by those skilled in the art that variations and modifications may be made within the scope and spirit of this invention, as defined by the following claims.

What is claimed is:

1. An electromagnetic assembly for an electromagnetic apparatus comprising:
    a ring case comprising:
        a first portion having a passage formed therein, wherein said passage has a first open end and a second open end; and
        a second portion having an annular groove formed therein;
    a coil bobbin disposed in said annular groove, wherein said coil bobbin comprises:
        a ring member comprising a tubular spool with a pair of annular flanges projecting radially from said spool; and
        an electrical wire, wherein said electrical wire is wound around said spool between said flanges; and
    a connector arrangement comprising:
        a body portion; and
        a projection portion extending from said body portion and into said passage, wherein a first end of said projection portion contacts said body portion, and a second end of said projection portion contacts one of said annular flanges and is flush with said second open end of said passage.

2. The electromagnet of claim 1, wherein said projection portion is fitted pressedly into said passage.

3. The electromagnet of claim 1, wherein a side surface of said projection portion is fixed adhesively to an annular wall of said passage.

* * * * *